M. H. BALLOU.

TAPE ATTACHMENT.

APPLICATION FILED NOV. 19, 1919.

Reissued Sept. 7, 1920.

14,947.

Witnesses

J. L. Hoy,

Thomas E. Turpin

Inventor

M. H. Ballou.

By Victor J. Evans

Att'y.

UNITED STATES PATENT OFFICE.

MARCUS H. BALLOU, OF PITTSBURGH, PENNSYLVANIA.

TAPE ATTACHMENT.

14,947. Specification of Reissued Letters Patent. Reissued Sept. 7, 1920.

Original No. 1,303,756, dated May 13, 1919, Serial No. 211,612, filed January 12, 1918. Application for reissue filed November 19, 1919. Serial No. 339,252.

*To all whom it may concern:*

Be it known that I, MARCUS H. BALLOU, a citizen of the United States, residing at Pittsburgh, in the county of Allegheny and State of Pennsylvania, have invented new and useful Improvements in Tape Attachments, of which the following is a specification.

One object of my present invention is the provision of a tape attachment adapted to be connected with a tape ring and having a body to lie in parallel relation to a tape and on which are cleats spaced from the body and from each other, whereby a tape by edgewise manipulation and buckling thereof may be introduced edgewise laterally between the cleats to be retained thereby against casual lateral displacement from the body.

Another object is the provision of a tape attachment capable of use to advantage in various relations to an object to be measured.

Another object is the provision of a tape attachment susceptible of being stamped from a single piece of sheet metal.

To the attainment of the foregoing, the invention consists in the improvement as hereinafter described and definitely claimed.

In the accompanying drawings, hereby made a part hereof:

Figure 1:
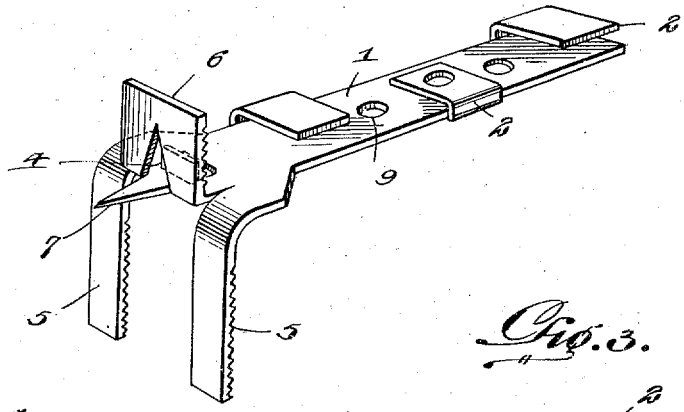
Figure 1 is a perspective of the device.
Figure 3:
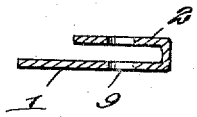
Fig. 3 is a cross sectional view through one of the cleats.
Figure 2:
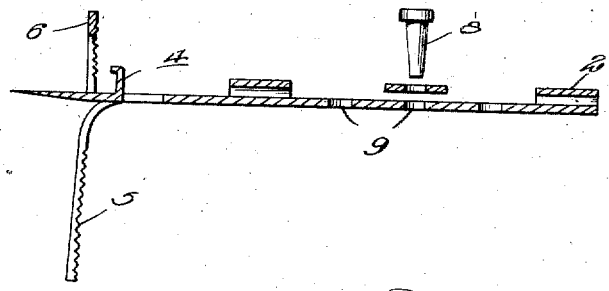
Fig. 2 is a longitudinal sectional view.

Referring more particularly to Fig. 1 of the drawing, it will be seen that the attachment consists of a body 1 stamped from a single sheet of metal and in such a manner that the entire formation can be accomplished at one operation of a stamping machine. Bent over the body 1 are cleats 2 which hold the tape 3 in parallel relation with the body, with the result that the ring of the tape measure is held against accidental movement from the finger 4. Extending laterally from the body are members 5 and 6 arranged in a position shown so as to engage a corner of a building or a side of a rail as clearly shown in Fig. 5.

Figure 4:
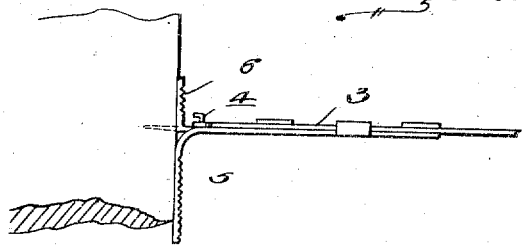
Figs. 4 and 5 are diagrammatic views, showing two uses of the device.

Extending in alinement with the body 1 and stamped from the member 6 is a prong 7 arranged to be inserted into an object as clearly shown in Fig. 4.

If found advantageous in practice, the ring of the tape may be adjustably associated with the body 1 by using the pin 8 in conjunction with the holes 9 in the body.

In applying the device to a tape, the tape ring is engaged with the finger 4, and either before or after such engagement, the tape is introduced laterally edgewise and by buckling of the tape if necessary between the cleats to flatwise position between the cleats, on the one hand, and the body 1, on the other, so that lateral movement of the tape relatively to said body is effectually prevented. To remove the attachment, the manipulation described is reversed.

From the foregoing description it will be seen that in a very inexpensive manner I provide a device by means of which the end of a tape may be accurately associated with the body to be measured.

Figure 5:
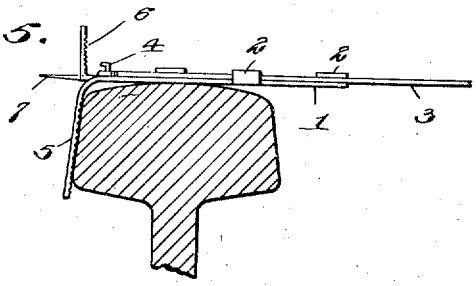

In the use of the device as shown in Fig. 5, the tape ring is slipped over the finger. When, however, the distance to the inner side of the rail head is to be measured, the pin 8 is passed through the tape ring and through one of the apertures 9 in the body, so that the extreme end of the ring will be held in alinement with the inner side of the rail head.

Having described my invention, what I claim and desire to secure by Letters-Patent, is:

1. A tape attachment having a body and means for the connection of a tape ring and also having cleats extending from one edge of the body and spaced from a common side thereof and also spaced from each other and a cleat reaching from the other edge of the body at a point between and spaced from the inner ends of the first-named cleats, whereby a tape may be introduced edgewise laterally between the cleats to be retained against causal lateral displacement by said cleats coöperating with said side of the body.

2. A tape attachment having a body to receive and be attached to a tape and also having at one end of the body portions extending in opposite directions from the sides thereof, and a prong extending from said end.

3. A one-piece tape attachment comprising a body with cleats extending from opposite edges thereof and spaced from a common side of the body an dalso spaced from each other, whereby a tape may be introduced edgewise laterally between the cleats to be retained against casual lateral displacement by said cleats coöperating with said side of the body, portions at one end of the body extending in opposite directions therefrom, and a prong extending from said end.

4. A tape attachment having a body and means for the connection of a tape and also having cleats extending from one edge of the body and spaced from a common side thereof and also spaced from each other and a cleat reaching from the other edge of the body at a point between and spaced from the first-named cleats, whereby a tape may be introduced edgewise laterally between the cleats to be retained against casual lateral displacement by said cleats coöperating with said side of the body; the body and the second-named cleat being provided with registering apertures to receive a tape-connecting pin.

In testimony whereof I hereunto affix my signature.

MARCUS H. BALLOU.